H. F. MAYNES.

AMUSEMENT APPARATUS.

APPLICATION FILED AUG. 15, 1921.

Reissued Dec. 6, 1921. 15,244.

INVENTOR
Hyla F. Maynes
BY
Pennie, Davis, Marvin & Edmonds
ATTORNEYS

UNITED STATES PATENT OFFICE.

HYLA FREDERICK MAYNES, OF GAINES, PENNSYLVANIA, ASSIGNOR OF ONE-HALF TO EMMA C. MAYNES, OF GAINES, PENNSYLVANIA.

AMUSEMENT APPARATUS.

15,244. Specification of Reissued Letters Patent. Reissued Dec. 6, 1921.

Original No. 1,361,476, dated December 7, 1920, Serial No. 402,638, filed August 10, 1920. Application for reissue filed August 15, 1921. Serial No. 492,510.

*To all whom it may concern:*

Be it known that I, HYLA FREDERICK MAYNES, a citizen of the United States, residing at Gaines, in the county of Tioga, State of Pennsylvania, have invented certain new and useful Improvements in Amusement Apparatus; and I do hereby declare the following to be a full, clear, and exact description of the invention, such as will enable others skilled in the art to which it appertains to make and use the same.

This invention relates to amusement devices of those types wherein the amusement comprises a ride in a car or conveyance. The success of such devices depends largely upon two elements—speed, and some element of surprise or novelty. This invention relates more particularly to the second of these elements, and has for an object the provision of a novel and unusual element of surprise in any amusement ride. This object is attained through the use of air blasts suddenly and unexpectedly applied.

It is a more specific object of this invention to provide means for applying these air blasts, and also to design a car or conveyance adapted to receive and utilize them effectively.

Figure 1:
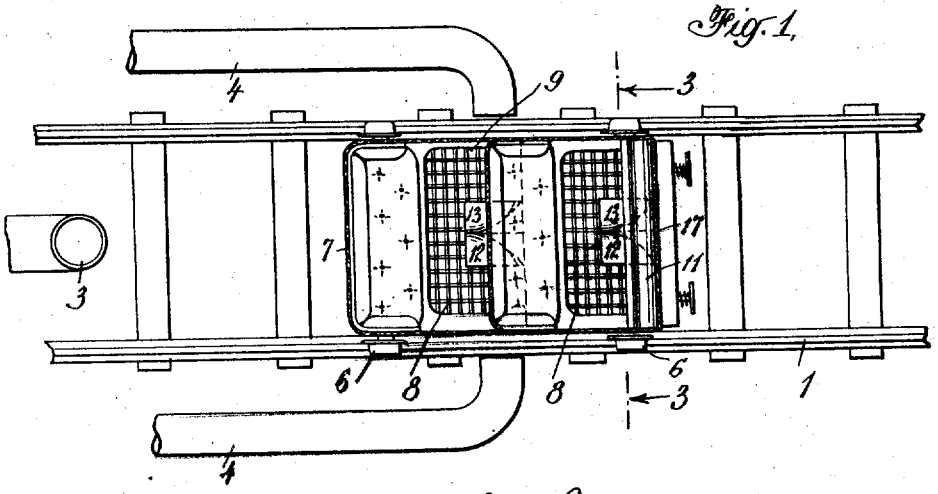
Figure 2:
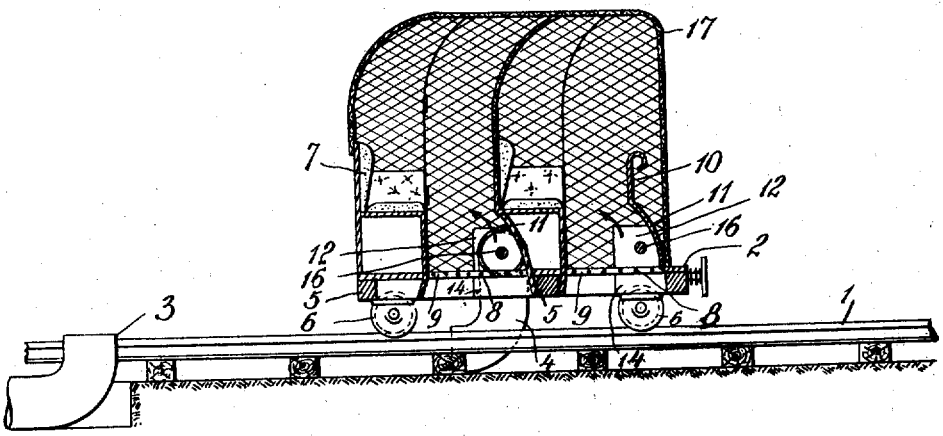
Figure 3:
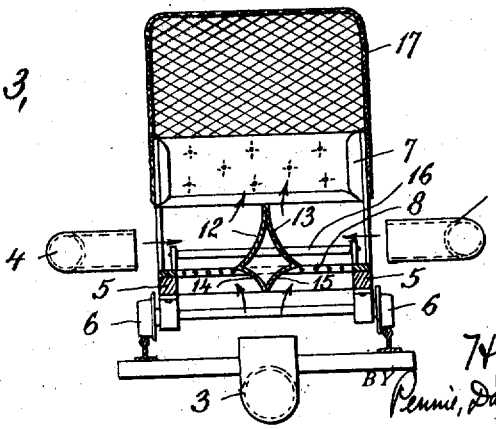

In order that the invention may be more clearly understood reference is had to the accompanying drawings disclosing a preferred embodiment thereof as applied to a pleasure railroad or roller-coaster; and in which, Figure 1 is a plan view of a section of the ordinary roller-coaster trackway, showing the position of the blower pipes with relation to the track and a passing car, Fig. 2 is a vertical, horizontal section through the trackway and car, likewise showing the position of the blower pipes; and Fig. 3 is a transverse, vertical section through the car and trackway.

In the drawings 1 represents the trackway upon which a car 2 is adapted to run, this trackway being provided with the ordinary inclines and declines so common in roller-coasters, or provided with any other desired means whereby the car may be propelled. Situated at intervals along this trackway are blower pipes 3 and 4, the former being disposed beneath the trackway and delivering its volume of air upwardly, while the latter are placed along the sides of the trackway and blow their air inwardly, in a horizontal direction, and at a level just above that of the floor of car 2, for a purpose which will be later described. Air is supplied to these pipes by means of an ordinary fan blower, or in any other desired manner, it being necessary only that a strong and reliable blast of air be secured, and the specific form of blower forms no part of this invention.

The car 2 comprises, in common with other roller-coaster cars, a base or body 5, rollers or wheels 6 and 7. Unlike most cars, however, it is provided with a foraminous floor or bottom 8 immediately in front of the seats 7. This floor may be provided with a series of relatively small openings 9, such as shown, or with a plurality of transverse or horizontal slots, the essential requisite being that an uninterrupted flow of air is permitted upwardly through the bottom of the car. The dashboard 10 of the car, and the rear of the front seat are curved to form deflecting surfaces 11 tending to direct the air currents entering through the bottom of the car toward the passengers occupying the seats. In the middle of the floor of the car, before each seat and closely adjacent the deflecting surfaces 11 are other deflecting surfaces 12 and 13 whose function it is to deflect the horizontal currents of air entering the car from the side through blower pipes 4 in an upward direction. Immediately below these deflecting surfaces 12 and 13 are other deflecting surfaces 14 and 15 whose function it is to deflect the upwardly directed currents of air from the blower pipe 3, around surfaces 12 and 13, and thus into the bottom of the car. The car is provided with foot rests 16 and the whole car is inclosed by means of a wire mesh cage 17.

The operation of the device is as follows: The car 2 moves along the trackway as is customary, and suddenly rides over the blower pipe 3, from which there is being constantly blown a strong current of air. This air passes through openings in the floor of the car, strikes against the transverse deflecting surfaces 11 and shoots upwardly into the faces of the passengers. Taken thus unawares, hats are blown off and much merriment results. The horizontally moving currents of air which enter the car from blower pipes 4 are deflected upwardly by means of deflecting surfaces 12 and 13, and rearwardly by means of deflecting surfaces 11, and thus ultimately act in a manner quite similar to those currents issuing from pipe 3. Either or both may be employed, the essential idea being that at varied and unexpected intervals along the ride, strong blasts of air are directed against the passengers in the car. The function of the cage 17 is to prevent the loss of hats which are likely to be blown off by the air currents which take the passengers completely by surprise.

I am aware that cars driven by compressed air motors are old and that it has been proposed to supply air to the receiving tanks of such motors from pipe lines paralleling the track. But this air would, of course, be under very high pressure and necessarily confined. It would not pass openly into the body of the car and contact with the passengers.

The invention has been illustrated and described in connection with a pleasure railroad or roller-coaster, but it is clear that it may be applied to amusement devices of any kind employing passenger carrying conveyances, whether or not these conveyances travel upon trackways. The conveyance might be suspended in the air, it might be a boat traveling upon a waterway, or a car designed to be driven at will over a pavement. It is, therefore, clear that the invention is broader than structural features illustrated and described. Although blasts of air have been shown directed upwardly through the conveyance, the invention in its broadest aspects embraces the use of a current of air passing into the car horizontally or otherwise. The use of blasts at intervals along the pathway traversed by the conveyance have been shown, but it is clear that the invention is broad enough to include the use of one air blast only.

I claim:

1. An amusement apparatus, comprising a trackway, a car designed to carry passengers and adapted to run upon the trackway, and means situated on the trackway for causing a current of air to rise openly in said car.

2. An amusement apparatus, comprising a trackway, a car adapted to run upon the trackway, and means situated at intervals along the trackway and causing a current of air to rise openly in said car.

3. An amusement apparatus, comprising a trackway, a car having a foraminous bottom adapted to run upon the trackway, and means situated on the trackway for blowing a current of air upwardly through the foraminous bottom of the car.

4. An amusement apparatus, comprising a trackway, a car having a foraminous bottom adapted to run upon the trackway, and blower pipes situated at intervals along the trackway to blow currents of air upwardly through the foraminous bottom of the passing car.

5. An amusement apparatus, comprising a trackway, a car having a foraminous bottom adapted to run upon the trackway, blower pipes situated in the trackway beneath the normal path of the car and at the side of the trackway just above the floor level of the car, and deflecting plates within the bottom of the car, the arrangement of the foregoing parts being such that as the car passes the blower pipes, currents of air are blown upwardly through the car.

6. An amusement apparatus, comprising a trackway, a car having a foraminous bottom adapted to run upon the trackway, blower pipes situated at intervals along the trackway to blow currents of air upwardly through the foraminous bottom of the passing car, and inclosed sides and top on said car.

7. An amusement apparatus car having a foraminous or perforated bottom, and deflecting plates near the bottom of the car designed to deflect currents of air upwardly through the car.

8. An amusement apparatus, comprising a conveyance designed to carry passengers, and means situated adjacent the path of travel of the conveyance for causing a current of air to rise in said conveyance and contact with the passengers.

9. An amusement apparatus, comprising a conveyance designed to carry passengers, and means situated at intervals along the path of travel of the conveyance for causing currents of air to rise in said conveyance and contact with the passengers.

10. An amusement apparatus, comprising a car having a foraminous bottom, and means situated adjacent the path of travel of the car for blowing a current of air upwardly through the foraminous bottom of the car.

11. An amusement apparatus, comprising a car having a foraminous bottom, and blower pipes situated at intervals along the path of travel of the car to blow currents of air upwardly through the foraminous bottom of the passing car.

12. An amusement apparatus, comprising a car having a foraminous bottom, deflecting plates within the bottom of the car, blower pipes situated adjacent the path of travel of the car just above the floor level, the arrangement of the foregoing parts being such that as the car passes the blower pipes, currents of air are blown upwardly through the car.

13. An amusement apparatus, comprising a car having a foraminous bottom, blower pipes situated at intervals along the path of travel of the car to blow currents of air upwardly through the bottom of the passing car, and inclosed sides and top on said car.

14. An amusement apparatus, comprising a trackway, a car designed to carry passengers and adapted to run upon the trackway, and means situated adjacent the trackway for causing unconfined currents of air to pass into the car.

15. An amusement apparatus, comprising a trackway, a car designed to carry passengers and adapted to run upon the trackway, and means situated at intervals along the trackway for causing unconfined currents of air to pass into the car.

16. An amusement apparatus, comprising a conveyance designed to carry passengers, and means situated adjacent the path of travel of the conveyance for causing an unconfined current of air to pass into said conveyance.

17. An amusement apparatus, comprising a conveyance designed to carry passengers, and means situated at intervals along the path of travel of the conveyance for causing unconfined currents of air to pass into said conveyance.

In testimony whereof I affix my signature.

HYLA FREDERICK MAYNES.